US011887389B2

(12) United States Patent
Kobashi

(10) Patent No.: US 11,887,389 B2
(45) Date of Patent: Jan. 30, 2024

(54) INSPECTION APPARATUS, INSPECTION METHOD, AND NON-TRANSITORY COMPUTER-READABLE STORAGE MEDIUM

(71) Applicant: CANON KABUSHIKI KAISHA, Tokyo (JP)

(72) Inventor: Kazufumi Kobashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 205 days.

(21) Appl. No.: 17/166,168

(22) Filed: Feb. 3, 2021

(65) Prior Publication Data

US 2021/0256677 A1 Aug. 19, 2021

(30) Foreign Application Priority Data

Feb. 18, 2020 (JP) ................................ 2020-025401

(51) Int. Cl.
*G06V 30/40* (2022.01)
*G06T 7/00* (2017.01)
*G06V 10/98* (2022.01)

(52) U.S. Cl.
CPC ............. *G06V 30/40* (2022.01); *G06T 7/001* (2013.01); *G06V 10/98* (2022.01); *G06T 2207/20104* (2013.01); *G06T 2207/30144* (2013.01)

(58) Field of Classification Search
CPC .......... G06T 7/001; G06T 2207/20104; G06T 2207/30144
See application file for complete search history.

(56) References Cited

U.S. PATENT DOCUMENTS

| 8,165,338 B2 | 4/2012 | Kobashi |
| 8,879,075 B2 | 11/2014 | Kitajima |
| 9,148,525 B2 | 9/2015 | Matsuoka |
| 11,250,558 B2 * | 2/2022 | Oki ......................... G06T 7/001 |
| 11,250,560 B2 * | 2/2022 | Korngut .................... G06T 7/62 |
| 11,305,552 B1 * | 4/2022 | Johnson ................ G06F 3/1234 |
| 11,397,549 B1 * | 7/2022 | Tamarez Gomez .... G06F 3/121 |
| 2004/0218838 A1 * | 11/2004 | Tojo ........................ G06F 16/50 382/181 |

(Continued)

FOREIGN PATENT DOCUMENTS

| JP | H10-161825 A | 6/1998 |
| JP | H10-222676 A | 8/1998 |

(Continued)

OTHER PUBLICATIONS

Sep. 29, 2023 Japanese Official Action in Japanese Patent Appln. No. 2020-025401.

(Continued)

*Primary Examiner* — Pinalben Patel
(74) *Attorney, Agent, or Firm* — Venable LLP

(57) ABSTRACT

An inspection apparatus comprises an obtaining unit configured to obtain first captured images of printed pages, a first setting unit configured to set an inspection region within a selected captured image selected from the first captured images of the respective pages obtained by the obtaining unit, and a second setting unit configured to perform setting performed on the selected captured image for the first captured image of a page decided based on a result of image analysis on the first captured images of the respective pages obtained by the obtaining unit.

20 Claims, 14 Drawing Sheets

(56) References Cited

U.S. PATENT DOCUMENTS

| | | | |
|---|---|---|---|
| 2006/0280358 A1* | 12/2006 | Ishikawa | G01N 21/95607 382/149 |
| 2012/0194847 A1* | 8/2012 | Matsuoka | H04N 1/00031 358/1.14 |
| 2013/0016382 A1 | 1/2013 | Kitajima | |
| 2014/0210982 A1* | 7/2014 | Zuo | G06T 7/001 382/145 |
| 2015/0199583 A1* | 7/2015 | Nagatomo | G06T 7/74 382/145 |
| 2020/0019353 A1 | 1/2020 | Okajima | |
| 2023/0177699 A1* | 6/2023 | Ray | G06T 7/12 382/173 |

FOREIGN PATENT DOCUMENTS

| | | | |
|---|---|---|---|
| JP | 2005-217931 A | | 8/2005 |
| JP | 2005205693 A | * | 8/2005 |
| JP | 2012-168166 A | | 9/2012 |
| JP | 2012-206461 A | | 10/2012 |
| JP | 2020-006603 A | | 1/2020 |
| WO | 2015/030785 A1 | | 3/2015 |

OTHER PUBLICATIONS

Dec. 4, 2023 Japanese Official Action in Japanese Patent Appln. No. 2020-025401.

* cited by examiner

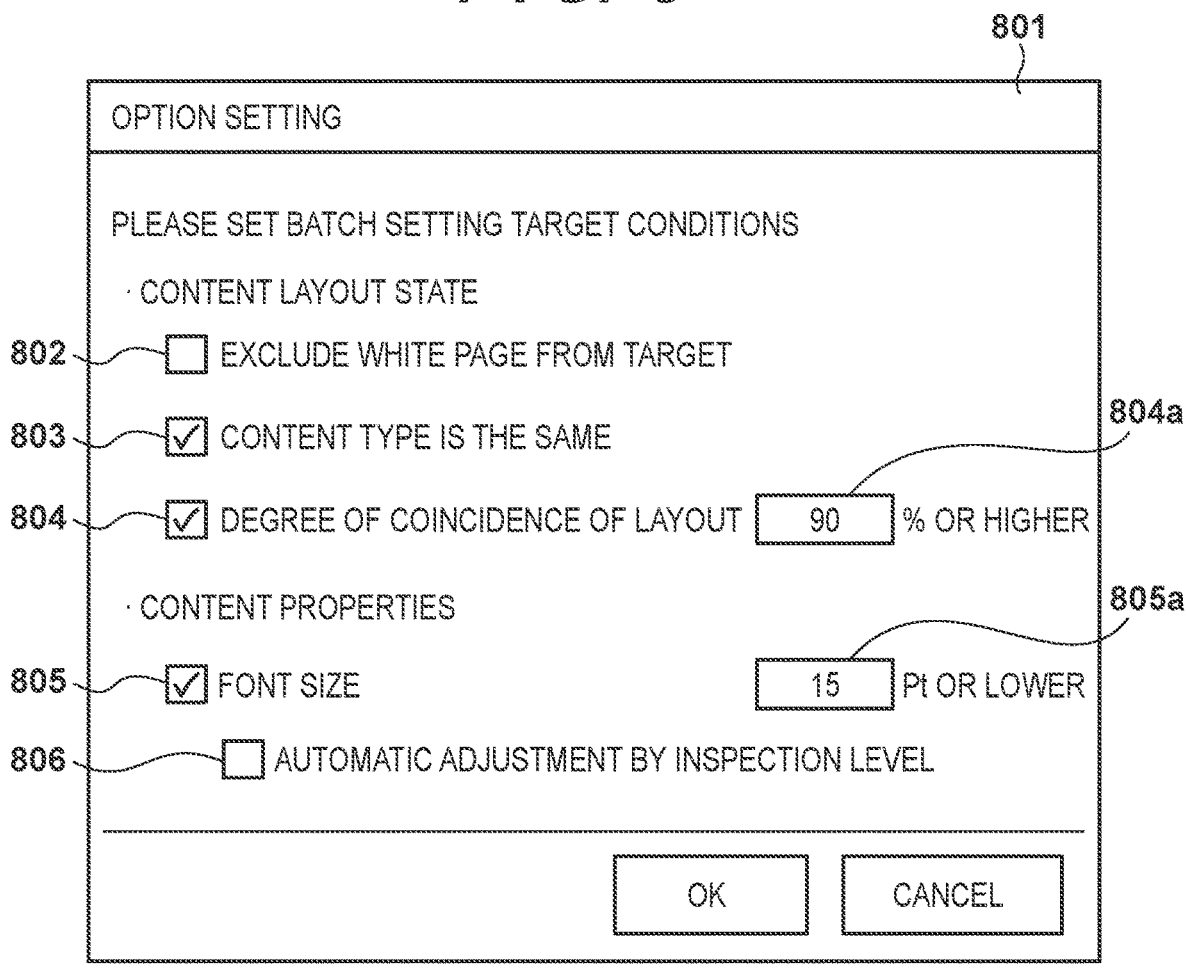

FIG. 10

```
<Batch Settings>

<!--ABBREVIATION-->

<Conditions>
        <White Page>true</White Page>          ——1001
        <Contents Type>true</Contents Type>    ——1002
        <Layout>true</Layout>                  ——1003
        <Layout Threshold>90</Layout Threshold> ——1004
        <Content Properties>
            <Font Size>15</Font Size>          ——1005
            <Auto Adjust>true</Auto Adjust>    ——1006
            ....
        </Content Properties>
    </Conditions>

<!--ABBREVIATION-->

</Batch Settings>
```

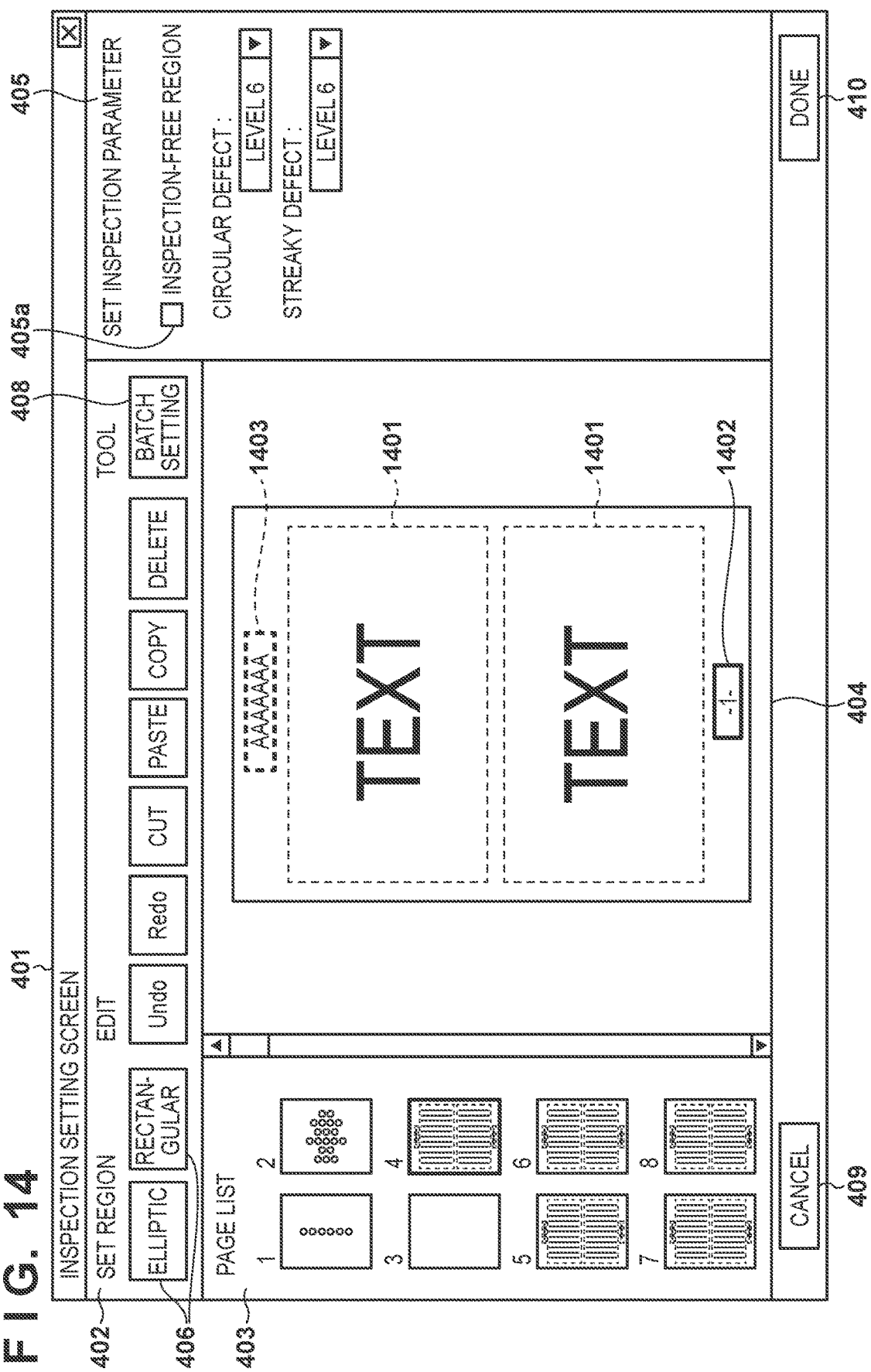

INSPECTION APPARATUS, INSPECTION METHOD, AND NON-TRANSITORY COMPUTER-READABLE STORAGE MEDIUM

BACKGROUND OF THE INVENTION

Field of the Invention

The present invention relates to a technique of inspecting a printed page.

Description of the Related Art

There is known an inspection apparatus that reads a product printed by a printing apparatus and inspects the quality of the printed product. The inspection apparatus can detect an image defect such as a stain or printing loss, a character error, barcode quality, or the like on a printed product. A printed product on which such a failure is detected is differentiated from a failure-free printed product by, for example, changing the discharge destination.

Since the required quality changes depending on the business form of a user or a printed product, it is important to execute an inspection necessary for an inspection request, and an optimum inspection region and inspection standard need to be set in accordance with an inspection target printed product. If the inspection standard is too loose, a printed product including a failure is shipped. However, if the inspection standard is too strict, a printed product that need not be a defective becomes a defective, the number of wastes increases, and the user needs to visually check again defectives for non-defectives. To solve this problem, a technique is disclosed in which pixels subjected to color conversion processing are automatically applied to an inspection region based on color conversion processing of a printed product (Japanese Patent Laid-Open No. 2012-168166).

According to the technique disclosed in Japanese Patent Laid-Open No. 2012-168166, pixels subjected to color conversion processing can be identified based on color conversion processing of the output setting of a printed product and automatically applied to an inspection region. However, according to this technique, a portion not subjected to color conversion processing cannot be automatically applied to the inspection region. A printed product such as a book or a manual includes pages as many as several hundred that do not always undergo color conversion processing, and an inspection region and an inspection standard need to be set for every page. Work to set an inspection region and an inspection standard takes a very long time, and setting errors readily occur.

SUMMARY OF THE INVENTION

The present invention provides a technique for efficiently performing the setting work of an inspection region for a plurality of pages.

According to the first aspect of the present invention, there is provided an inspection apparatus comprising: an obtaining unit configured to obtain first captured images of printed pages; a first setting unit configured to set an inspection region within a selected captured image selected from the first captured images of the respective pages obtained by the obtaining unit; and a second setting unit configured to perform setting performed on the selected captured image for the first captured image of a page decided based on a result of image analysis on the first captured images of the respective pages obtained by the obtaining unit.

According to the second aspect of the present invention, there is provided an inspection method comprising: obtaining first captured images of printed pages; setting an inspection region within a selected captured image selected from the first captured images of the respective obtained pages; and performing setting performed on the selected captured image for the first captured image of a page decided based on a result of image analysis on the first captured images of the respective obtained pages.

According to the third aspect of the present invention, there is provided a non-transitory computer-readable storage medium storing a computer program for causing a computer to function as: an obtaining unit configured to obtain first captured images of printed pages; a first setting unit configured to set an inspection region within a selected captured image selected from the first captured images of the respective pages obtained by the obtaining unit; and a second setting unit configured to perform setting performed on the selected captured image for the first captured image of a page decided based on a result of image analysis on the first captured images of the respective pages obtained by the obtaining unit.

Further features of the present invention will become apparent from the following description of exemplary embodiments with reference to the attached drawings.

BRIEF DESCRIPTION OF THE DRAWINGS

FIG. 8 is a view showing a display example of an option setting screen 801;

FIG. 9 is a table showing an example of the structure of a table;

FIG. 10 is a view showing an example of the structure of inspection setting data set on the option setting screen 801;

FIG. 14 is a view showing a display example of a page preview portion 404 at which an inspection region (inspection-free region) excluded from inspection targets in a reference image is displayed.

DESCRIPTION OF THE EMBODIMENTS

Figure 1:
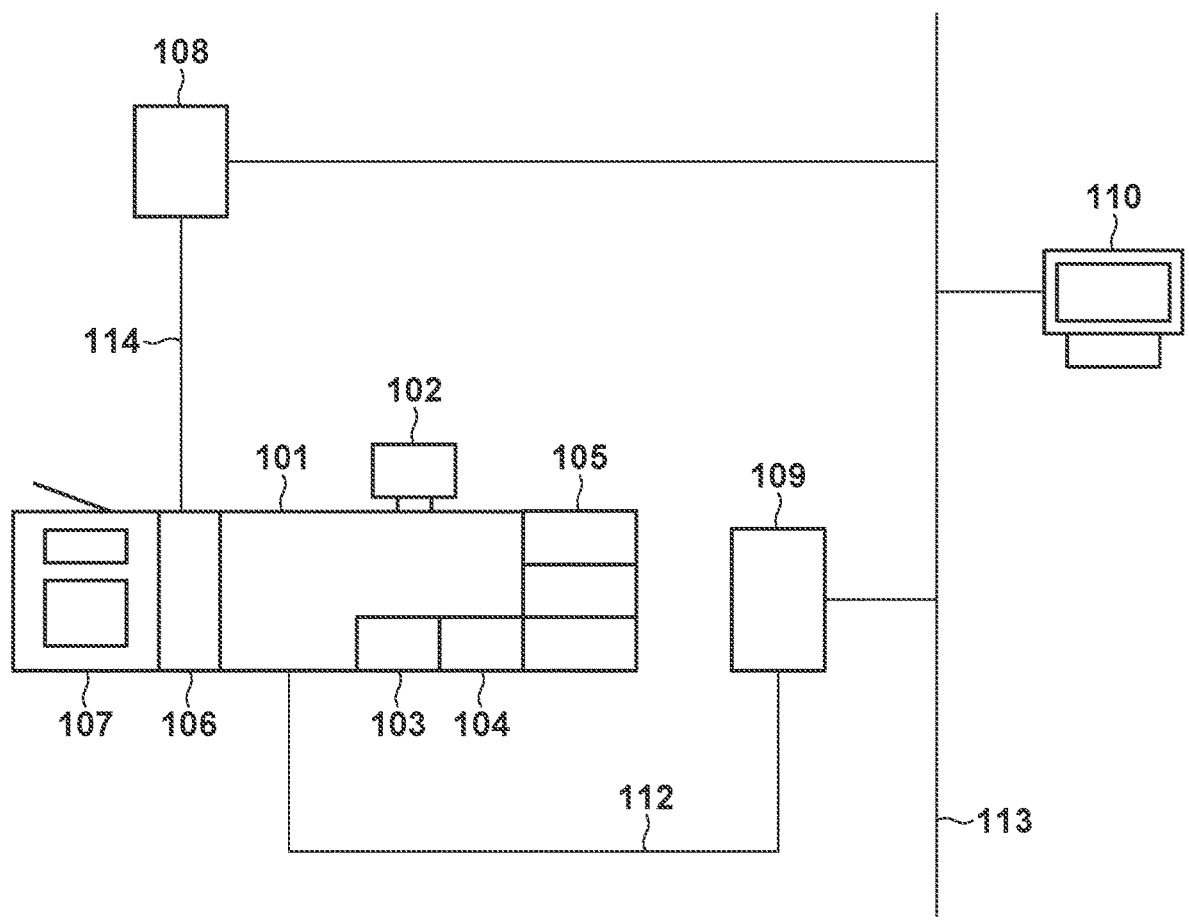
FIG. 1 is a view showing an example of the arrangement of a system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

First, an example of the arrangement of a system according to the first embodiment will be described with reference to FIG. 1. As shown in FIG. 1, the system according to the embodiment includes a client computer 110, an inspection apparatus 108, an information processing apparatus 109, and a printing apparatus 101.

The printing apparatus 101 according to the embodiment will be explained as an electrophotographic printing apparatus. However, the image forming method in the printing apparatus 101 is not limited to the electrophotographic method and may be another image forming method such as an inkjet method or an offset method.

The printing apparatus 101 is connected to the information processing apparatus 109 via a cable 112. The information processing apparatus 109 is connected to the client computer 110 and the inspection apparatus 108 via a network 113.

The printing apparatus 101 includes a UI (User Interface) panel 102, feed decks 103 and 104, an optional deck 105 having three feed decks, an inspection unit 106, and a large-capacity stacker 107. The inspection unit 106 is connected to the inspection apparatus 108 via a cable 114. The large-capacity stacker 107 includes a main tray and a top tray, and thousands of sheets can be stacked on the main tray at once.

A print job is generated by the client computer 110, transmitted to the information processing apparatus 109 via the network 113, and managed by the information processing apparatus 109. The print job is then transmitted from the information processing apparatus 109 to the printing apparatus 101 via the cable 112. The printing apparatus 101 performs print processing to print an image and a text on a sheet based on the print job, thereby generating a printed product of one or more pages. Note that an arrangement may also be employed in which a print job is generated and managed by the information processing apparatus 109 and transmitted to the printing apparatus 101 via the cable 112, and the printing apparatus 101 performs print processing to print an image and a text on a sheet based on the print job.

Note that an arrangement may also be employed in which the client computer 110, the information processing apparatus 109, and the inspection apparatus 108 are connected to the cable 112 and can communicate with the printing apparatus 101. The form of connection between the apparatuses shown in FIG. 1 is merely an example, and the connection between the apparatuses may be wired, wireless, or a combination of them.

Next, an example of the hardware arrangement of each of the printing apparatus 101, the inspection unit 106, the large-capacity stacker 107, the inspection apparatus 108, the information processing apparatus 109, and the client computer 110 will be described with reference to the block diagram of FIG. 2.

First, an example of the hardware arrangement of the printing apparatus 101 will be explained. A CPU 201 executes various processes using computer programs and data stored in a RAM 202. The CPU 201 controls the operation of the overall printing apparatus 101 (performs control and calculation in each unit of the printing apparatus 101 via a system bus 212), and executes or controls each processing that is performed by the printing apparatus 101 in the following description.

The RAM 202 is an example of a volatile memory, and has an area for storing computer programs and data loaded from a storage unit 205, and data received from an external apparatus. Further, the RAM 202 has a work area used when the CPU 201 executes various processes. In this manner, the RAM 202 can provide various areas, as needed.

The UI panel 102 includes a display unit for displaying the result of processing by the CPU 201 as an image, a text, or the like, and an operation unit operated by the user to perform various operation inputs. The UI panel 102 is, for example, a touch panel screen.

A feed deck I/F 204 is an interface for performing data communication with a feed deck 211 (including the feed decks 103 and 104 and the optional deck 105).

An engine I/F 209 is an interface for performing data communication with a printer engine 210. The printer engine 210 is an engine that controls a print operation based on print data to, for example, form a print image based on print data.

The storage unit 205 is an example of a nonvolatile memory. The storage unit 205 stores an OS (Operating System), and computer programs and data for causing the CPU 201 to execute or control each processing that is performed by the printing apparatus 101 in the following description. The storage unit 205 can store data externally received by the printing apparatus 101. The storage unit 205 can provide part of the memory area as a work area. If necessary, computer programs and data stored in the storage unit 205 are loaded into the RAM 202 under the control of the CPU 201 and processed by the CPU 201.

A video I/F 206 is an interface for transmitting/receiving image data to/from the information processing apparatus 109 (a video I/F 233) via a video cable 241. An NW I/F 207 is an interface for performing data communication with the information processing apparatus 109 (an NW I/F 238) via a cable 213. An accessory I/F 208 is an interface for performing data communication with the inspection unit 106 (an accessory I/F 214) and the large-capacity stacker 107 (an accessory I/F 220) via a cable 225.

Figure 2:
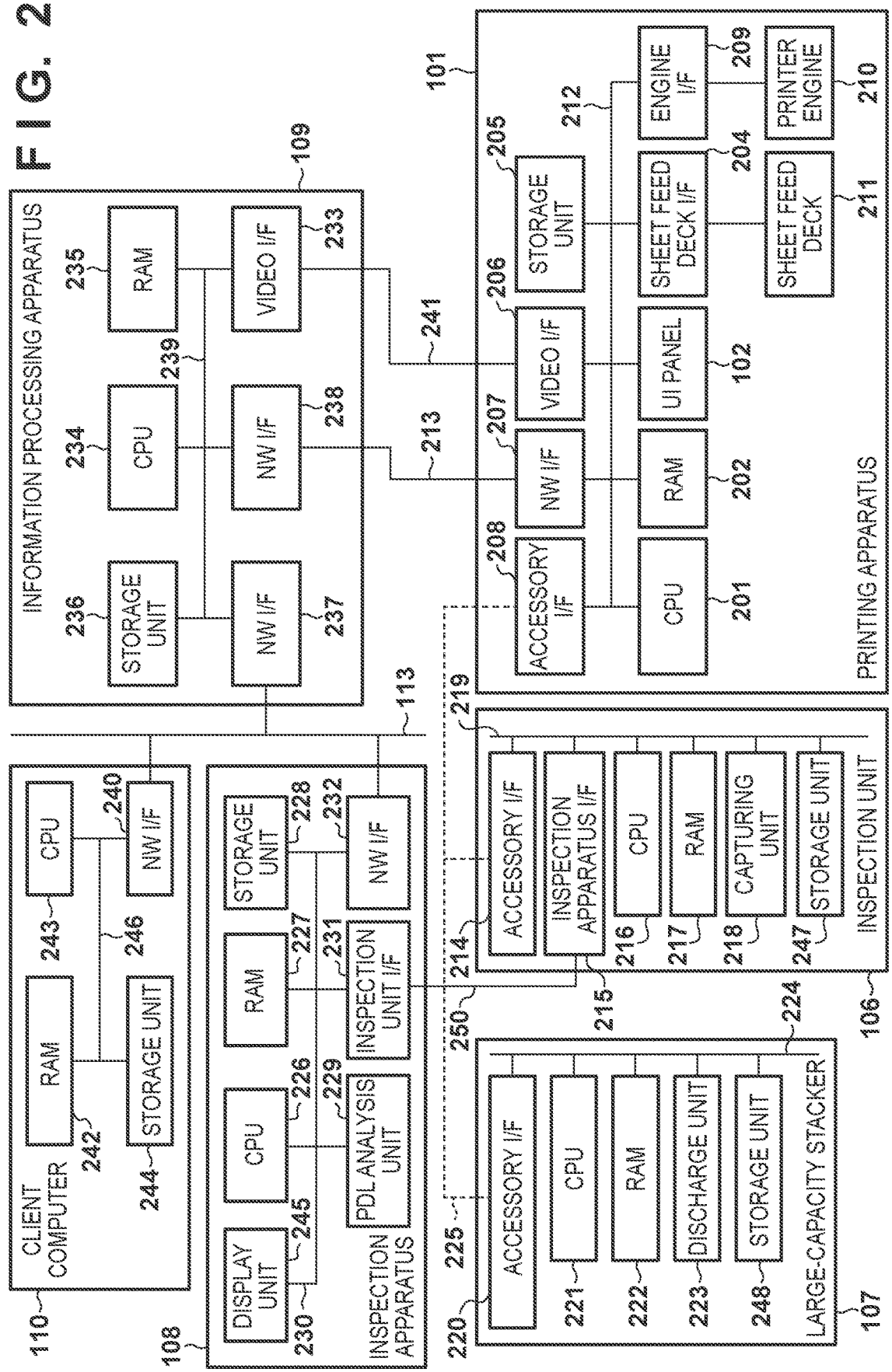
FIG. 2 is a block diagram showing an example of the hardware arrangement of each apparatus in the system.

In FIG. 2, the I/F connected to the system bus 212 of the printing apparatus 101 and the I/F connected to a system bus 239 of the information processing apparatus 109 are directly connected. However, the information processing apparatus 109 and the printing apparatus 101 may be connected via, for example, a network, and the connection form is not limited to a specific one.

Next, an example of the hardware arrangement of the inspection unit 106 will be explained. A CPU 216 executes various processes using computer programs and data stored in a RAM 217. The CPU 216 controls the operation of the overall inspection unit 106 (performs control and calculation in each unit of the inspection unit 106 via a system bus 219), and executes or controls each processing that is performed by the inspection unit 106 in the following description.

The RAM 217 is an example of a volatile memory, and has an area for storing computer programs and data loaded from a storage unit 247, and data received from an external apparatus. Further, the RAM 217 has a work area used when the CPU 216 executes various processes. The RAM 217 can provide various areas, as needed.

A capturing unit 218 has a capturing function of performing capturing using, for example, a contact image sensor (CIS). The capturing unit 218 captures the image of a sheet (printed page) passing through the inspection unit 106, and transmits a captured image obtained by the capturing to the inspection apparatus 108 via an inspection apparatus I/F 215. Note that the CIS is merely an example of the sensor of the capturing unit 218, and the capturing unit 218 may have a sensor of another type such as a CCD image sensor.

The storage unit 247 is an example of a nonvolatile memory. The storage unit 247 stores an OS (Operating System), and computer programs and data for causing the CPU 216 to execute or control each processing that is performed by the inspection unit 106 in the following description. The storage unit 247 can store data externally received by the inspection unit 106. The storage unit 247 can provide part of the memory area as a work area. If necessary, computer programs and data stored in the storage unit 247 are loaded into the RAM 217 under the control of the CPU 216 and processed by the CPU 216.

The accessory I/F 214 is an interface for performing data communication with the printing apparatus 101 (accessory I/F 208) via the cable 225. The inspection apparatus I/F 215 is an interface for performing data communication with the inspection apparatus 108 (an inspection unit I/F 231) via a cable 250.

Next, the large-capacity stacker 107 will be explained. A CPU 221 executes various processes using computer programs and data stored in a RAM 222. The CPU 221 controls the operation of the overall large-capacity stacker 107 (performs control and calculation in each unit of the large-capacity stacker 107 via a system bus 224), and executes or controls each processing that is performed by the large-capacity stacker 107 in the following description.

The RAM 222 is an example of a volatile memory, and has an area for storing computer programs and data loaded from a storage unit 248, and data received from an external apparatus. Further, the RAM 222 has a work area used when the CPU 221 executes various processes. The RAM 222 can provide various areas, as needed.

A discharge unit 223 performs a discharge operation to the main tray or the top tray, and monitors and controls the stacking statuses of the main tray and top tray.

The storage unit 248 is an example of a nonvolatile memory. The storage unit 248 stores an OS (Operating System), and computer programs and data for causing the CPU 221 to execute or control each processing that is performed by the large-capacity stacker 107 in the following description. The storage unit 248 can store data externally received by the large-capacity stacker 107. The storage unit 248 can provide part of the memory area as a work area. If necessary, computer programs and data stored in the storage unit 248 are loaded into the RAM 222 under the control of the CPU 221 and processed by the CPU 221.

The accessory I/F 220 is an interface for performing data communication with the printing apparatus 101 (accessory I/F 208) via the cable 225.

Next, the inspection apparatus 108 will be explained. A CPU 226 executes various processes using computer programs and data stored in a RAM 227. The CPU 226 controls the operation of the overall inspection apparatus 108 (performs control and calculation in each unit of the inspection apparatus 108 via a system bus 230), and executes or controls each processing that is performed by the inspection apparatus 108 in the following description.

The RAM 227 is an example of a volatile memory, and has an area for storing computer programs and data loaded from a storage unit 228, and data received from an external apparatus. Further, the RAM 227 has a work area used when the CPU 226 executes various processes. The RAM 227 can provide various areas, as needed.

The storage unit 228 is an example of a nonvolatile memory. The storage unit 228 stores an OS (Operating System), and computer programs and data for causing the CPU 226 to execute or control each processing that is performed by the inspection apparatus 108 in the following description. The storage unit 228 can store data externally received by the inspection apparatus 108. The storage unit 228 can provide part of the memory area as a work area. If necessary, computer programs and data stored in the storage unit 228 are loaded into the RAM 227 under the control of the CPU 226 and processed by the CPU 226.

A PDL analysis unit 229 analyzes PDL data such as PDF, PostScript, and PCL received from the client computer 110 and the information processing apparatus 109.

The inspection unit I/F 231 is an interface for performing data communication with the inspection unit 106 (inspection apparatus I/F 215) via the cable 250. An NW I/F 232 is an interface for performing data communication with the information processing apparatus 109 and the client computer 110 via the network 113. A display unit 245 includes a liquid crystal screen or a touch panel screen, displays the result of processing by the CPU 226 as an image, a text, or the like, and accepts various operation inputs from the user.

Next, the information processing apparatus 109 will be explained. A CPU 234 executes various processes using computer programs and data stored in a RAM 235. The CPU 234 controls the operation of the overall information processing apparatus 109 (performs control and calculation in each unit of the information processing apparatus 109 via the system bus 239), and executes or controls each processing that is performed by the information processing apparatus 109 in the following description.

The RAM 235 is an example of a volatile memory, and has an area for storing computer programs and data loaded from a storage unit 236, and data received from an external apparatus. Further, the RAM 235 has a work area used when the CPU 234 executes various processes. The RAM 235 can provide various areas, as needed.

The storage unit 236 is an example of a nonvolatile memory. The storage unit 236 stores an OS (Operating System), and computer programs and data for causing the CPU 234 to execute or control each processing that is performed by the information processing apparatus 109 in the following description. The storage unit 236 can store data externally received by the information processing apparatus 109. The storage unit 236 can provide part of the memory area as a work area. If necessary, computer programs and data stored in the storage unit 236 are loaded into the RAM 235 under the control of the CPU 234 and processed by the CPU 234.

The video I/F 233 is an interface for transmitting/receiving image data to/from the printing apparatus 101 (video I/F 206) via the video cable 241. The NW I/F 238 is an interface for performing data communication with the printing apparatus 101 (NW I/F 207) via the cable 213. An NW I/F 237 is an interface for performing data communication with the inspection apparatus 108 and the client computer 110 via the network 113.

Next, the client computer 110 will be explained. A CPU 243 executes various processes using computer programs and data stored in a RAM 242. The CPU 243 controls the operation of the overall client computer 110 (performs control and calculation in each unit of the client computer 110 via a system bus 246). Also, the CPU 243 executes or controls each processing that is performed by the client computer 110 in the following description.

The RAM 242 is an example of a volatile memory, and has an area for storing computer programs and data loaded from a storage unit 244, and data received from an external apparatus. Further, the RAM 242 has a work area used when the CPU 243 executes various processes. The RAM 242 can provide various areas, as needed.

The storage unit 244 is an example of a nonvolatile memory. The storage unit 244 stores an OS (Operating System), and computer programs and data for causing the CPU 243 to execute or control each processing that is performed by the client computer 110 in the following description. The storage unit 244 can store data externally received by the client computer 110. The storage unit 244 can provide part of the memory area as a work area. If necessary, computer programs and data stored in the storage unit 244 are loaded into the RAM 242 under the control of the CPU 243 and processed by the CPU 243. An NW I/F 240 is an interface for performing data communication with the inspection apparatus 108 and the information processing apparatus 109 via the network 113.

Figure 3:
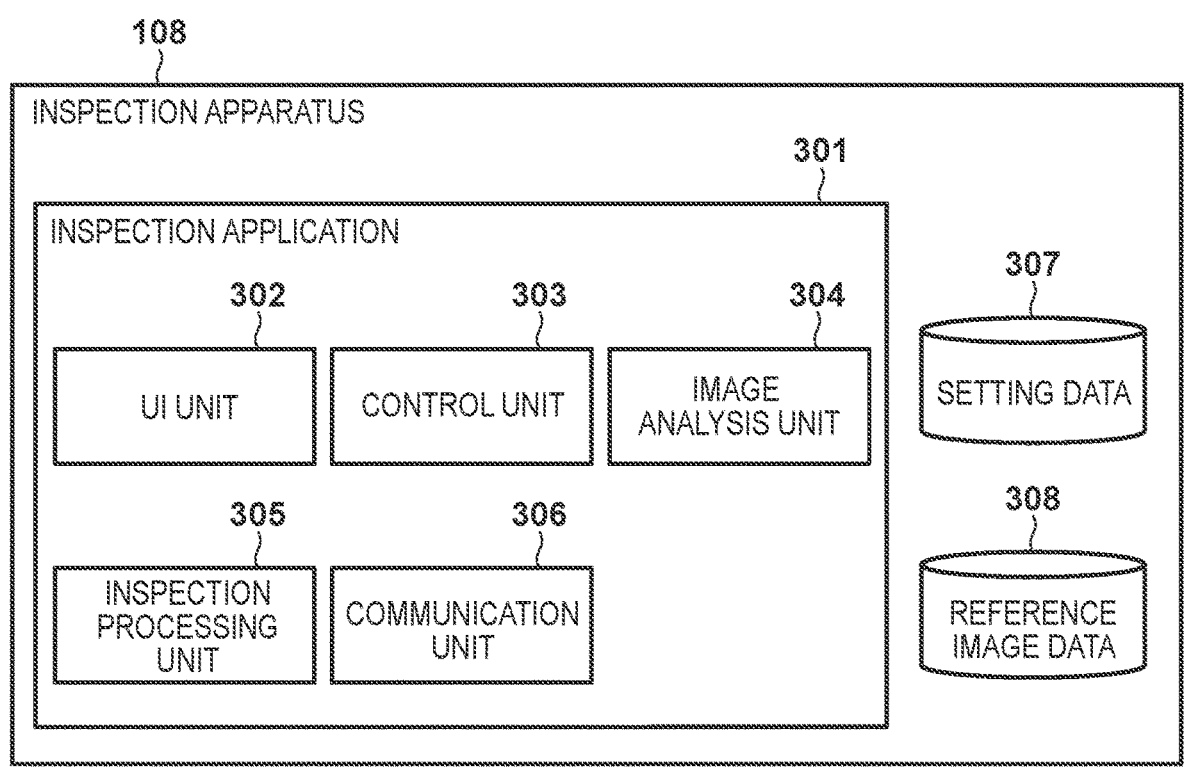
FIG. 3 is a block diagram showing an example of the functional arrangement of an inspection apparatus 108.

Next, an example of the functional arrangement of the inspection apparatus 108 will be described with reference to the block diagram of FIG. 3. Each functional unit shown in FIG. 3 will be explained as the entity of processing. In practice, however, the CPU 226 executes a computer program for causing the CPU 226 to execute the function of each functional unit, thereby implementing the function of the functional unit. Note that each functional unit in FIG. 3 may be implemented by hardware.

An inspection application 301 is a program module that is installed in the storage unit 228 of the inspection apparatus 108, loaded into the RAM 227 by the CPU 226, and executed by the CPU 226. Note that the inspection application 301 may be installed in the information processing apparatus 109 or the client computer 110.

A UI unit 302 builds a graphical user interface (GUI) to be displayed on the display unit 245, accepts various input operations from the user to the display unit 245, and designates execution of corresponding processing. A control unit 303 controls the operation of the inspection application 301.

An image analysis unit 304 analyzes a captured image of a sheet captured by the capturing unit 218, and extracts content information serving as information about contents such as a text, image, and graphics included in the captured image from the captured image serving as the result of image analysis of the captured image. In the image analysis of the captured image, contents are extracted from the captured image, and analysis of the layout of each content (the position, type, and size of each content laid out on a sheet) and analysis (OCR) of a text (character string) are performed. In the embodiment, the algorithm of the image analysis is not limited to a specific one as long as the type (text, image, or graphics) of each content included in a captured image, the layout of the content, a character string, its size and color, and the like can be obtained from the captured image. In order to perform image analysis, it is also possible to receive from the printing apparatus 101 a page description language corresponding to a sheet in a captured image, perform image analysis on the page description language information, and obtain similar information.

An inspection processing unit 305 compares a captured image obtained by the capturing unit 218 with a reference image registered in advance in the inspection apparatus 108, and inspects whether a page in the captured image has a defect. If the inspection processing unit 305 determines as a result of this inspection that "a page in the captured image has a defect", it notifies the inspection unit 106 of NG determination and performs processing for causing the discharge unit 223 of the large-capacity stacker 107 to "stack the sheet of this page on the top tray".

A communication unit 306 receives from the inspection unit 106 the captured image of a page captured by the capturing unit 218, and notifies the inspection unit 106 of the result (NG determination) of determination by the inspection processing unit 305.

Setting data 307 is various kinds of setting information of the inspection application 301. Reference image data 308 is a data group including a reference image, information that defines an inspection region in the reference image, and inspection parameters set for the inspection region.

Figure 4:
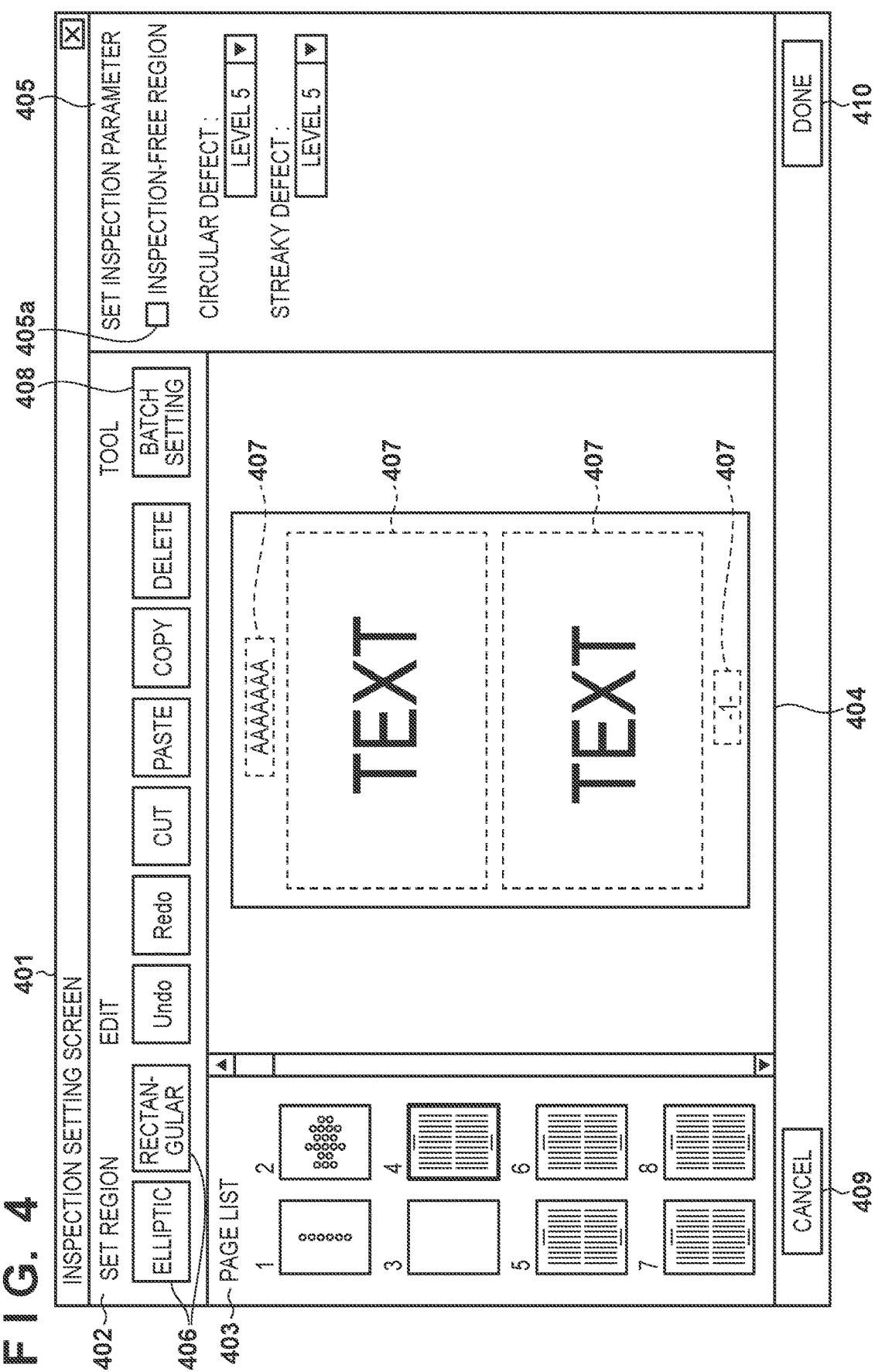
FIG. 4 is a view showing a display example of the inspection setting screen of an inspection application 301.

Next, the "inspection setting screen (GUI) of the inspection application 301" displayed on the display unit 245 when the CPU 226 executes the inspection application 301 will be described with reference to FIG. 4. FIG. 4 is a view showing a display example of the inspection setting screen of the inspection application 301.

An inspection setting screen 401 includes a toolbar 402, a display portion 403 for a page list, a page preview portion 404, and a setting portion 405 for inspection parameters. The toolbar 402 includes tool buttons 406 to set an elliptic or rectangular inspection region. The toolbar 402 also includes a tool button (Undo) to "undo" executed processing, and a tool button (Redo) to "redo" executed processing. Further, the toolbar 402 includes a tool button (cut) to execute cutting of an inspection region, a tool button (paste) to execute paste of an inspection region, a tool button (copy) to execute copy of an inspection region, and a tool button (delete) to execute delete of an inspection region. The toolbar 402 includes a batch setting button 408 serving as a button for designating processing of setting a set inspection region and inspection parameters at once for a plurality of pages. Details of the batch setting button 408 will be described later.

The thumbnails (captured images of pages received from the capturing unit 218) of pages of a printed product subjected to inspection setting are displayed at the display portion 403 for a page list. When a printed product is formed from one page, the thumbnail of this page is displayed at the display portion 403. When a printed product is formed from a plurality of pages, thumbnails corresponding to the respective pages are displayed at the display portion 403. When the user inputs a selection instruction to select one of thumbnails displayed at the display portion 403, the captured image of a page corresponding to the selected thumbnail is displayed as a preview image (selected captured image) at the page preview portion 404.

The user can select either of elliptic and rectangular shapes as the shape of an inspection region by designating either tool button 406 in a state in which the preview image of a page subjected to inspection setting is displayed at the page preview portion 404. After selecting the shape of the inspection region, the user performs a drag operation on the preview image with his/her finger, a pointer, or the like and can set an inspection region 407 (in the shape set with the tool button 406) at the dragged position and size. In FIG. 4, rectangular inspection regions 407 are set at four portions on the preview image.

The setting portion 405 accepts the setting of parameters (inspection parameters) regarding an inspection region set on a preview image by the user. The setting portion 405 allows setting the inspection levels of a circular defect and streaky defect. In the embodiment, inspection levels 7, 6, 5, 4, 3, 2, and 1 are defined in the descending order of severity of inspection. For example, when the inspection level for a circular defect is set at "7", if a φ0.15-mm or larger circular image region (formed from NG pixels to be described later) is detected from a captured image, it is determined as a "defect" (circular defect). When the inspection level for a circular defect is set at "3", if a φ0.2-mm or larger circular image region (formed from NG pixels to be described later) is detected from a captured image, it is determined as a "defect" (circular defect). In this manner, as the inspection level is lowered, the inspection standard is relaxed. Note that the inspection standard may be defined not by the above-mentioned level but by an actual size such as φ0.15 mm or larger. The setting portion 405 includes a check box 405a for making a setting of excluding an inspection region from inspection targets. When the user designates and checks the check box 405a, the setting of excluding an inspection region from inspection targets can be enabled. Details of the check box 405a will be described in the second embodiment.

The inspection setting screen 401 further includes a cancel button 409 that is designated by the user to stop inspection setting, and a Done button 410 that is designated by the user to finalize and end inspection setting.

The user can use this inspection setting screen to perform inspection setting (setting of an inspection region and setting of inspection parameters for the inspection region) for the captured image of a page.

Figure 5:
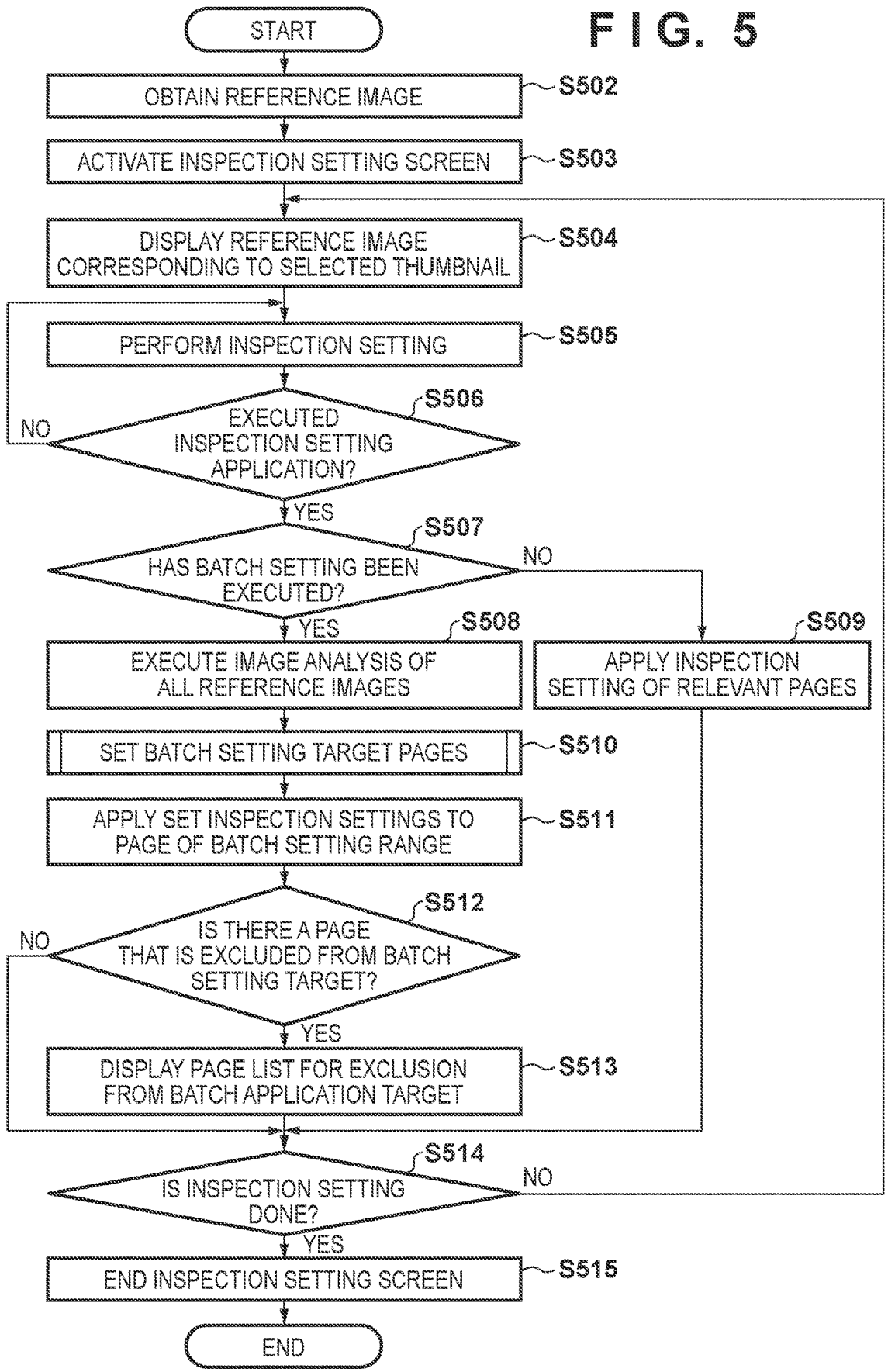
FIG. 5 is a flowchart of reference image creation processing and inspection setting processing using the inspection setting screen in FIG. 4.

Next, reference image creation processing and inspection setting processing using the inspection setting screen in FIG. 4 according to the first embodiment will be described with reference to FIG. 5 showing a flowchart of them.

PDF data serving as print data is transmitted from the client computer 110 to the information processing apparatus 109, and transferred from the information processing apparatus 109 to the printing apparatus 101. The printing apparatus 101 prints based on the PDF data. In the printing, a sheet of a page bearing a printed image and text is captured by the capturing unit 218 of the inspection unit 106, and the captured image generated by the capturing is transmitted to the inspection apparatus 108. The communication unit 306 receives the captured image of the page transmitted from the inspection unit 106.

In step S502, the control unit 303 obtains, as "reference images", captured images of respective pages received by the communication unit 306 from the inspection unit 106. In step S503, the UI unit 302 displays on the display unit 245 the inspection setting screen 401 having the arrangement exemplified in FIG. 4. At this time, the UI unit 302 displays at the display portion 403 a list of the thumbnails of the reference images of the respective pages obtained in step S502.

In step S504, the UI unit 302 displays at the page preview portion 404 the reference image (selected captured image) of a page corresponding to a thumbnail selected and designated by the user among the thumbnails displayed at the display portion 403.

The user performs an operation of setting an inspection region on the reference image (within the selected captured image) by operating a tool button on the toolbar 402 or performing a drag operation or the like within the page preview portion 404. The user also performs an operation of setting inspection parameters for the inspection region set on the reference image by operating the setting portion 405. In step S505, the control unit 303 accepts these user operations and performs inspection setting (setting of an inspection region and setting of inspection parameters for the inspection region).

In step S506, the control unit 303 determines whether the inspection setting for the reference image of the page currently displayed at the page preview portion 404 is completed. For example, assume that the user performs on the display unit 245 one of operations "input an instruction to select the thumbnail of a page different from the page currently displayed at the page preview portion 404", "designate the batch setting button 408", and "designate the Done button 410". In this case, the process advances to step S507. If the user has performed none of these operations at the display portion 403, the process advances to step S505. If the user designates the cancel button 409, the process advances to step S514.

In step S507, the control unit 303 determines whether the operation performed on the display unit 245 by the user is "designate the batch setting button 408". If the control unit 303 determines that the operation performed on the display unit 245 by the user is "designate the batch setting button 408", the process advances to step S508. If the control unit 303 determines that the operation performed on the display unit 245 by the user is not "designate the batch setting button 408", the process advances to step S509.

In step S508, the image analysis unit 304 performs image analysis processing on each reference image obtained in step S502. More specifically, the image analysis unit 304 performs image analysis of each reference image obtained in step S502, extracts content information about contents included in the reference image, and stores the extracted content information and the reference image in the RAM 227 in association with each other. As described above, the content information includes the type of contents included in a reference image, the layout of the contents, a character string, its size and color, and the like.

In step S510, target pages serving as pages subjected to batch setting are set (decided). Details of the processing in step S510 will be described later with reference to the flowchart of FIG. 6.

In step S511, the control unit 303 applies, to the page currently displayed at the page preview portion 404 and the target pages set in step S510, setting information representing the details (the position and size of the inspection region in the reference image, and the inspection parameters for the inspection region) set by the inspection setting in step S505. That is, the control unit 303 stores the setting information in the RAM 227 as setting information of the page currently displayed at the page preview portion 404 and that of the target pages set in step S510.

In step S512, the control unit 303 determines whether even one page not set as a target page in step S510 exists among the pages (reference images) obtained in step S502. If the control unit 303 determines that one or more pages not set as target pages in step S510 exist among the pages (reference images) obtained in step S502, the process advances to step S513. If the control unit 303 determines that all the pages (reference images) obtained in step S502 are set as target pages in step S510, the process advances to step S514.

Figure 7:
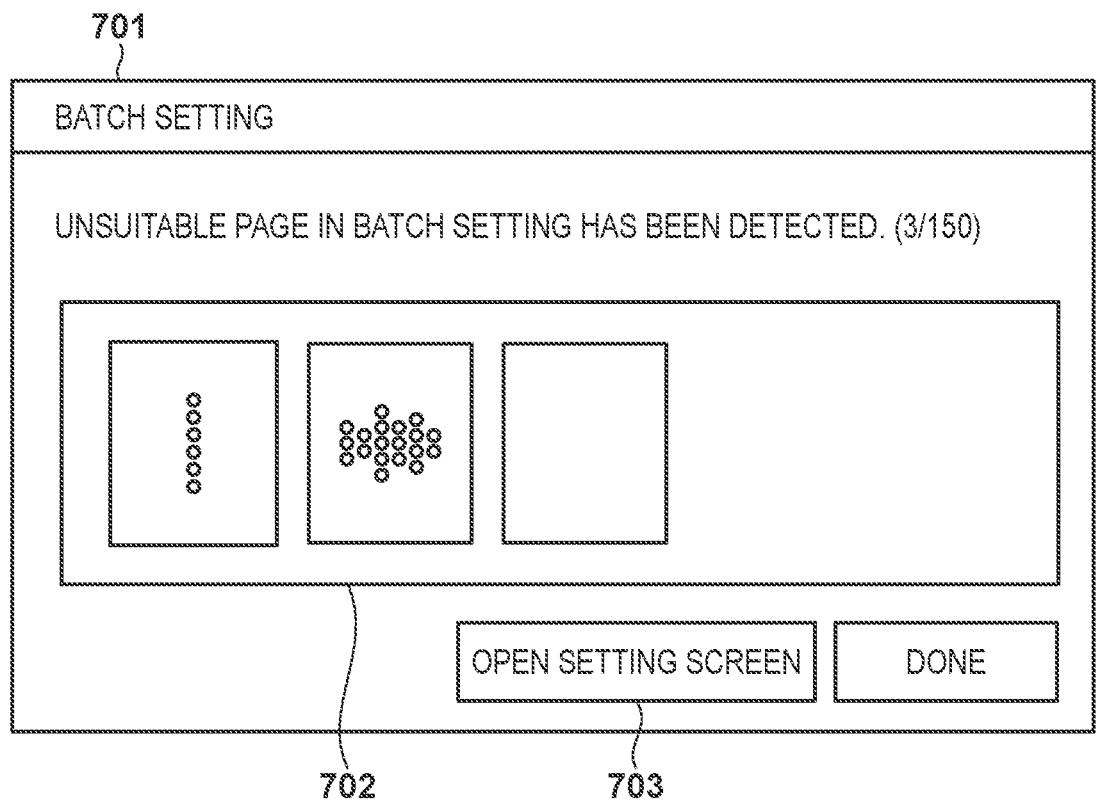
FIG. 7 is a view showing a display example of a list of thumbnails in step S513.

In step S513, the UI unit 302 displays on the display unit 245 a list of the thumbnails of the reference images of pages not set as target pages among the reference images of the pages obtained in step S502. FIG. 7 shows a display example of a list of the thumbnails in step S513. A screen 701 shown in FIG. 7 is a screen for displaying a list of thumbnails 702 of the reference images of pages not set as target pages among the reference images of the pages obtained in step S502. When the user designates a button 703 after designating the thumbnail 702 displayed in the list on the screen 701, the display unit 245 may display the inspection setting screen 401 in FIG. 4 to perform inspection setting for a page corresponding to the thumbnail 702. Note that the user may set whether to display the screen 701 in FIG. 7, and this setting is included in the setting data 307 as a setting of the inspection application 301.

In step S509, the control unit 303 applies to the page currently displayed at the page preview portion 404 setting information representing the details set by the inspection setting in step S505. That is, the control unit 303 stores the setting information in the RAM 227 as setting information of the page currently displayed at the page preview portion 404.

In step S514, the control unit 303 determines whether to complete the inspection setting of the reference images. For example, the control unit 303 determines whether the user has designated the Done button 410. If the control unit 303 determines to complete the inspection setting of the reference images (the user has designated the Done button 410), the process advances to step S515. If the control unit 303 determines not to complete the inspection setting of the reference images (the user has not designated the Done button 410), the process returns to step S504.

In step S515, the control unit 303 associates the reference image with the setting information serving as the details of the inspection setting set for the reference image on the inspection setting screen 401 in FIG. 4, and registers them in the reference image data 308. The UI unit 302 closes the inspection setting screen 401 in FIG. 4, and the inspection application 301 ends. If the user designates the cancel button 409, the details of the inspection setting set by preprocessing are discarded, and only the reference image is registered in the reference image data 308.

Next, details of the processing in step S510 will be described with reference to the flowchart of FIG. 6.

First, in step S601, the control unit 303 reads out from the setting data 307 "inspection setting data defining conditions (conditions for determining a page as a batch setting target) that should be satisfied by a page (target page) to which the details of the inspection setting performed in step S505 are applied". The user can create the inspection setting data by operating an option setting screen 801 in FIG. 8. The option setting screen 801 in FIG. 8 is a screen that is displayed on the display unit 245 when the user designates a button (not shown) on the toolbar 402 of the inspection setting screen 401 in FIG. 4.

In the example of FIG. 8, the conditions for determining a page as a batch setting target are four conditions "white page", "content type in a page", "degree of coincidence of a contents layout in a page", and "font size used in a page".

A check box 802 is checked to enable the condition "white page". When the condition "white page" is enabled, it is set to exclude from target pages a page corresponding to a white page having no content in the page.

A check box 803 is checked to enable the condition "content type in a page". When the condition "content type in a page" is enabled, a page including a content of the same type as the type (text, image, or graphics) of a content in a reference image is set as a target page.

A check box 804 is checked to enable the condition "degree of coincidence of a layout". When the condition "degree of coincidence of a layout" is enabled, a page in which the degree of coincidence of a contents layout in a reference image is equal to or higher than a threshold is set as a target page. As the threshold, a numerical value input to a threshold input area 804a in accordance with a user operation is applied. In the example of FIG. 8, a page in which the degree of coincidence of a contents layout in a reference image is equal to or higher than 90% is set as a target page.

The "degree of coincidence" is determined based on whether there is a content of the same size and same type at the same position, from the content information obtained by image analysis processing on the reference image in step S508. That is, the ratio of contents whose positions, sizes, and types coincide with those of all contents in a reference image is defined as the degree of coincidence. The degree of coincidence may be weighted in accordance with the details. For example, it may be set that the weight is 1 for the difference of the position of a content and 5 for the difference of the type (text, image, or the like) of a content, and a page having a large layout difference is excluded. Even the "degree of coincidence of a layout" setting includes the above-described determinations of the white page and content type. When the white page or content type is specially designated to select a target page, the above-described conditions "white page" and "content type" are used.

A check box 805 is checked to enable the condition "font size used in a page". When the condition "font size used in a page" is enabled, a page in which the font size used is equal to or smaller than a threshold is set as a target page. As the threshold, a numerical value input to a threshold input area 805a in accordance with a user operation is applied. In the example of FIG. 8, if the font size used in a page is equal to or smaller than 15 Pt, the page is set as a target page.

If the font size is different, the size of a defect to be detected is also different. Thus, the font size is adopted as a condition for determining a page as a batch setting target. Note that the threshold of the font size may be automatically adjusted in accordance with the inspection level. A check box 806 is checked to automatically adjust the threshold of the font size.

FIG. 9 shows an example of the structure of a table looked up when the control unit 303 automatically adjusts the threshold of the font size. In this table, a corresponding threshold is registered for each inspection level (inspection precision). As shown in FIG. 9, as the inspection level is higher (severer), a smaller defect is detected and thus the threshold of the font size becomes smaller. In the example of FIG. 9, if the inspection level is "5", the threshold of the font size is 12 Pt. When the check box 806 is checked, the control unit 303 looks up the table and obtains a threshold corresponding to the current inspection level.

FIG. 10 shows an example of the structure of inspection setting data set on the option setting screen 801 of FIG. 8. The inspection setting data is stored in the setting data 307. A description 1001 indicates a set value representing whether to exclude a white page from batch setting targets. A description 1002 indicates a set value representing whether to set a page as a batch setting target based on whether the content type is the same. A description 1003 indicates a set value representing whether to set a page as a batch setting target based on the degree of coincidence of a layout. A description 1004 indicates the set value of the threshold of the degree of coincidence of a layout. A description 1005 indicates a set value representing whether to set a page as a batch setting target based on the font size. A description 1006 indicates whether to set automatic adjustment based on an inspection level regarding the font size. In the description 1005, a font size input to the threshold input area 805a is set. If the set font size is 0, a target page is not determined based on the font size. If the set font size is equal to or larger than 1, a target page is determined based on the font size.

Referring back to FIG. 6, processes in subsequent steps S602 to S612 are performed for each reference image obtained in step S502.

In step S602, the control unit 303 selects an unselected reference image as a selected reference image from the reference images obtained in step S502. The control unit 303 refers to the description 1001 included in the inspection setting data read out in step S601, and determines whether the setting of excluding a white page is enabled. If the control unit 303 determines that the setting is enabled, the process advances to step S603. If the control unit 303 determines that the setting is disabled, the process advances to step S604.

In step S603, the control unit 303 refers to the content information stored in the RAM 227 in association with the selected reference image in step S508, and determines whether the selected reference image corresponds to a white page. If the control unit 303 determines that the selected reference image corresponds to a white page, the process advances to step S613. If the control unit 303 determines that the selected reference image does not correspond to a white page, the process advances to step S604.

In step S604, the control unit 303 refers to the description 1002 included in the inspection setting data read out in step S601, and determines whether the setting of determining a target page in accordance with the content type is enabled. If the control unit 303 determines that the setting is enabled, the process advances to step S605. If the control unit 303 determines that the setting is disabled, the process advances to step S606.

In step S605, the control unit 303 determines whether the "type of a content included in the selected reference image" represented by the content information of the selected reference image is the same as the "type of a content included in the reference image currently displayed at the page preview portion 404" represented by the content information of the reference image currently displayed at the page preview portion 404. For example, when a content included in the reference image currently displayed at the page preview portion 404 is a text, but a content included in the selected reference image is an image, it is determined that "a content included in the reference image currently displayed at the page preview portion 404 and a content included in the selected reference image are different". If the control unit 303 determines that the type of the content is the same, the process advances to step S606. If the control unit 303 determines that the type of the content is different, the process advances to step S613.

In step S606, the control unit 303 refers to the description 1003 included in the inspection setting data read out in step S601, and determines whether the setting of determining a target page in accordance with the degree of coincidence of a content layout is enabled. If the control unit 303 determines that the setting is enabled, the process advances to step S607. If the control unit 303 determines that the setting is disabled, the process advances to step S608.

In step S607, the control unit 303 determines whether the degree of coincidence between the "layout of contents included in the selected reference image" represented by the content information of the selected reference image and the "layout of contents included in the reference image currently displayed at the page preview portion 404" represented by the content information of the reference image currently displayed at the page preview portion 404 is equal to or lower than a threshold (within a threshold) represented by the description 1004. If the control unit 303 determines that the degree of coincidence is equal to or lower than the threshold, the process advances to step S608. If the control unit 303 determines that the degree of coincidence is higher than the threshold, the process advances to step S613.

In step S608, the control unit 303 refers to the description 1005 included in the inspection setting data read out in step S601, and determines whether the setting of determining a target page in accordance with the content properties is enabled. If the control unit 303 determines that the setting is enabled (the description 1005 represents a font size "1" or larger), the process advances to step S609. If the control unit 303 determines that the setting is disabled (the description 1005 represents a font size "0"), the process advances to step S612.

In step S609, the control unit 303 refers to the description 1006 included in the inspection setting data read out in step S601, and determines whether the setting of performing automatic adjustment setting based on an inspection level regarding the font size is enabled. If the control unit 303 determines that the setting is enabled, the process advances to step S610. If the control unit 303 determines that the setting is disabled, the process advances to step S611. In step S610, the control unit 303 obtains a threshold corresponding to the current inspection level by looking up the table in FIG. 9.

In step S611, the control unit 303 determines whether the "font size of a content included in the selected reference image" represented by the content information of the selected reference image is equal to or smaller than (within) a threshold. As this threshold, a threshold input to the threshold input area 805a is used when the process advances from step S609 to step S611, and a threshold obtained in step S610 is used when the process advances from step S609 to step S611 via step S610.

If the control unit 303 determines that the font size of a content included in the selected reference image is equal to or smaller than the threshold, the process advances to step S612. If the control unit 303 determines that the font size is larger than the threshold, the process advances to step S613.

In step S612, the control unit 303 sets the selected reference image as a target page.

In step S613, the control unit 303 determines whether all the reference images obtained in step S502 have been selected as selected reference images (whether the processes in steps S602 to S612 have been performed for all the reference images obtained in step S502).

Figure 6:
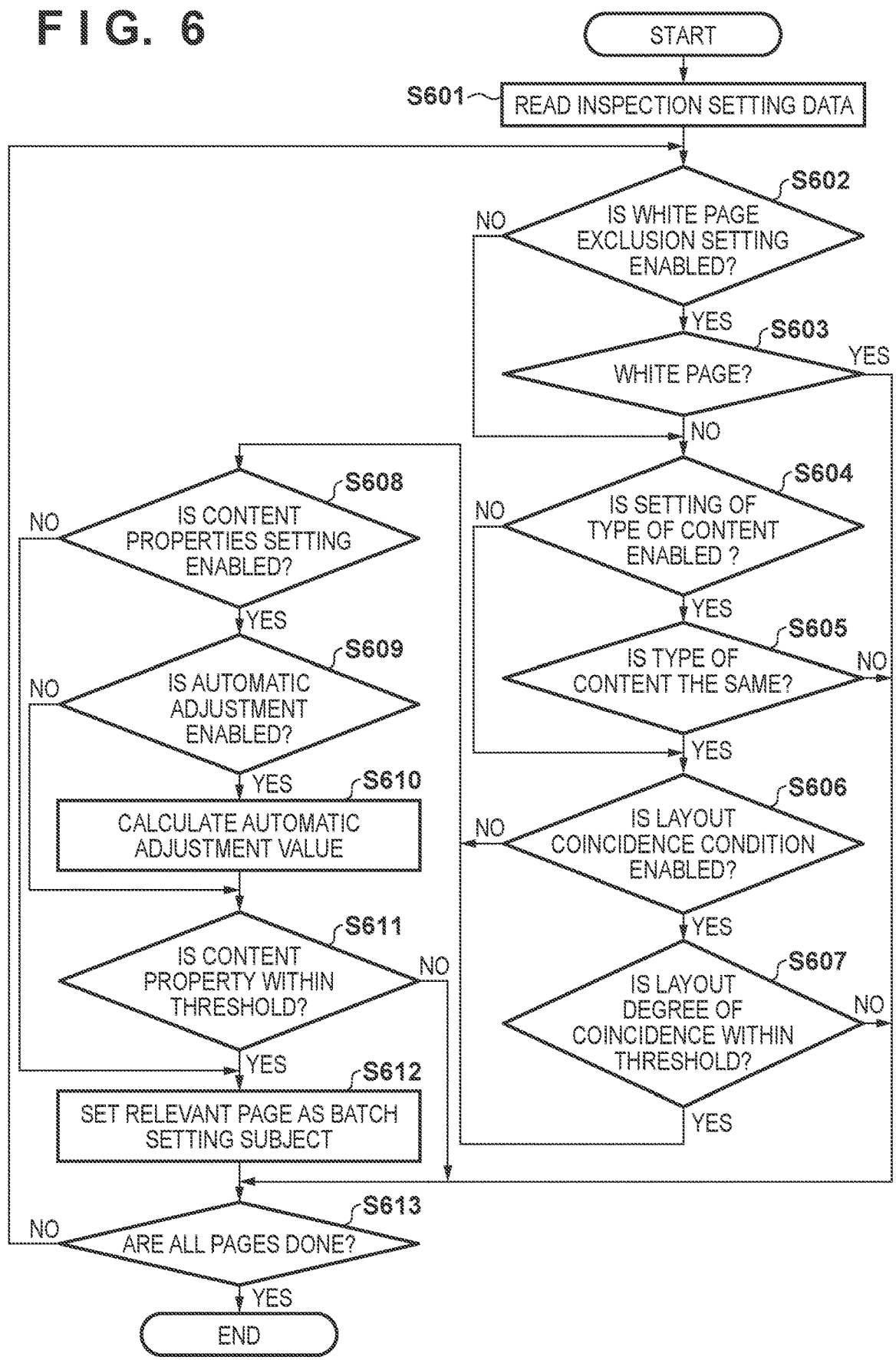
FIG. 6 is a flowchart showing details of processing in step S510.

If the control unit 303 determines that all the reference images obtained in step S502 have been selected as selected reference images (the processes in steps S602 to S612 have been performed for all the reference images obtained in step S502), the processing according to the flowchart of FIG. 6 ends. Then, the process advances to step S511. If the control unit 303 determines that a reference image not selected as a selected reference image remains among the reference images obtained in step S502 (a reference image not having undergone the processes in steps S602 to S612 remains among the reference images obtained in step S502), the process returns to step S602.

Although the processing of determining whether to set a page as a batch setting target has been described in the order of a white page, content type, contents layout, and content properties, the processing order is not limited to this. Although the font size has been exemplified as a content property, properties such as the font color and typeface may be added to the determination processing.

By performing the processes according to the flowcharts of FIGS. 5 and 6, a reference image to which the details of the inspection setting set for a specific reference image are applicable can be determined in accordance with the type, layout, properties, and the like of contents, and the details of the inspection setting can be set at once for the applicable reference image.

Figure 11:
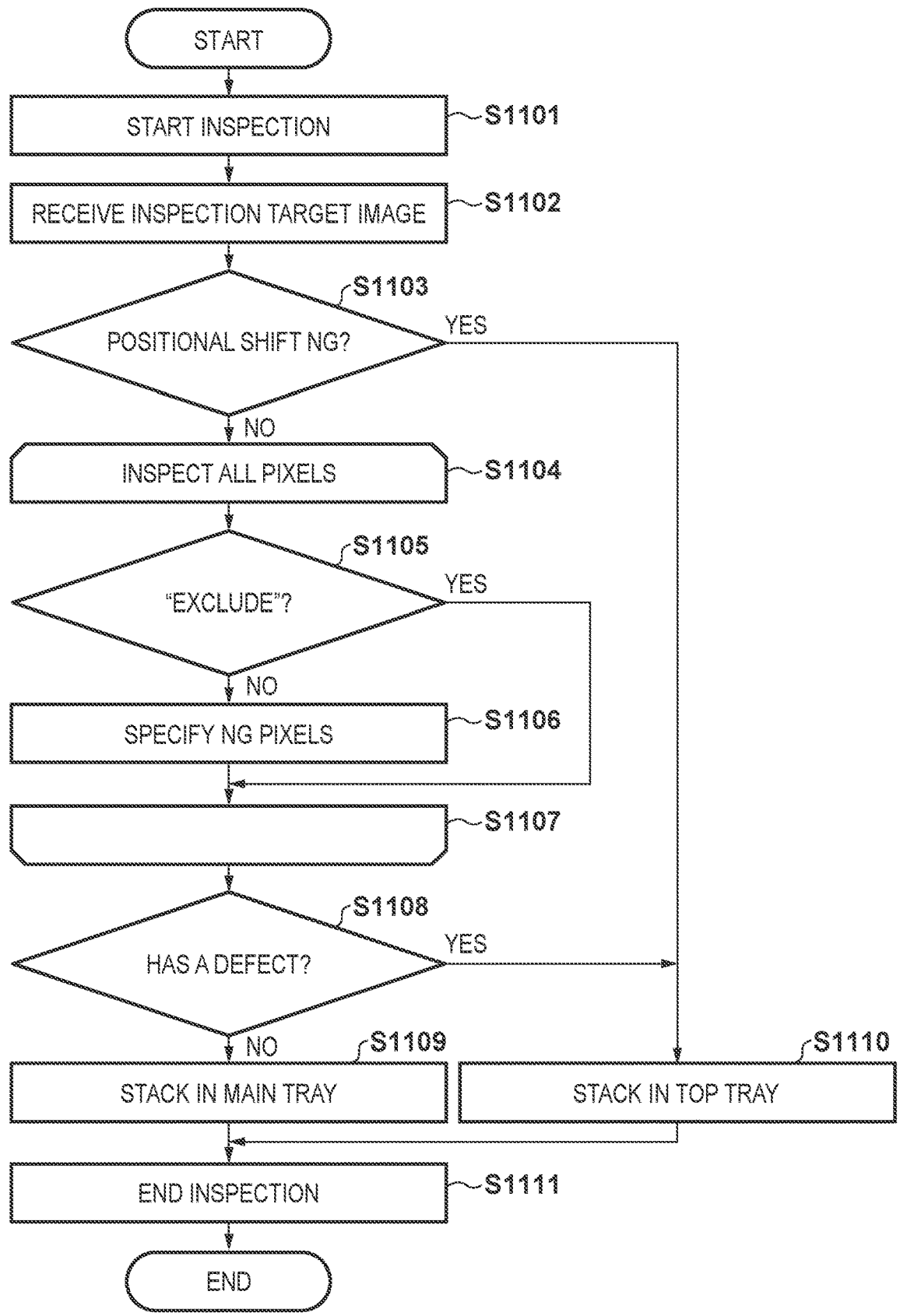
FIG. 11 is a flowchart of inspection processing performed on each page transmitted from a printing apparatus 101 after inspection setting using an inspection setting screen 401.

Next, inspection processing performed for each page transmitted from the printing apparatus 101 after inspection setting using the inspection setting screen 401 in FIG. 4 will be described with reference to FIG. 11 showing a flowchart of this processing.

In step S1101, the UI unit 302 accepts an inspection start instruction from the user to the display unit 245. Then, the UI unit 302 notifies the inspection processing unit 305 of the acceptance of the inspection start instruction from the user to the display unit 245 upon reception of this instruction.

In step S1102, after receiving the notification from the UI unit 302, the inspection processing unit 305 instructs the capturing unit 218 of the inspection unit 106 via the inspection unit I/F 231 and the inspection apparatus I/F 215 to prepare for reading of an inspection target image.

The client computer 110 transmits PDF data (similar to the above-described PDF data) to the information processing apparatus 109 via the NW I/Fs 240 and 237. The PDF data is transferred from the information processing apparatus 109 to the printing apparatus 101 via the NW I/Fs 238 and 207 and the video I/Fs 233 and 206. The printing apparatus 101 prints based on the PDF data. In the printing, a sheet of a page bearing a printed image and text is captured by the capturing unit 218 of the inspection unit 106, and the captured image generated by the capturing is transmitted to the inspection apparatus 108. The communication unit 306 receives the captured image of the page transmitted from the inspection unit 106. In step S1102, the captured image received by the communication unit 306 from the inspection unit 106 is obtained as an inspection target image.

Note that the PDF data may be stored in the storage unit 205 of the printing apparatus 101 and read out by the CPU 201 from the storage unit 205 to perform printing based on the PDF data. In other words, an apparatus that holds PDF data and the transfer method are not limited to specific ones as long as the printing apparatus 101 can print based on the PDF data. Also, print data is not limited to PDF data and may be an image or data in a format such as PostScript.

Then, in step S1103, the inspection processing unit 305 reads out, as a comparison reference image from reference images registered in the reference image data 308 in step S515 described above, a reference image of the same page as the page of the inspection target image. The inspection processing unit 305 compares the readout comparison reference image with the inspection target image obtained in step S1102, and checks a positional shift of the page within the image. The positional shift check method is not limited to a specific one.

For example, the inspection processing unit 305 compares the positional relationship between four corners of the page (sheet) within the comparison reference image and four corners of the region of an image/text printed on the page within the comparison reference image, with the positional relationship between four corners of the page (sheet) within the inspection target image and four corners of the region of an image/text printed on the page within the inspection target image.

The comparison between the positional relationships is calculated by, for example, four corners of a page (sheet), and the value of affine transformation of the feature points of the image/text extracted by edge detection of the image/text printed on the page. If the position of the image/text printed on the sheet in the inspection target image falls outside a preset allowable range of the positional shift (the difference between the positional relationships is large), the process advances to step S1110.

In step S1110, the inspection processing unit 305 notifies the inspection unit 106 via the communication unit 306 of NG determination. The inspection unit 106 notifies the large-capacity stacker 107 of this notification, and the large-capacity stacker 107 causes the discharge unit 223 to perform processing for "stacking the sheet of a page corresponding to an inspection target image on the top tray".

If the position of the image/text printed on the sheet in the inspection target image falls within the preset allowable range of the positional shift (the difference between the positional relationships is small) as a result of the check in step S1103, the process advances to step S1104.

Then, processes in steps S1104 to S1107 are performed for each pixel of the inspection target image. In step S1105, the inspection processing unit 305 selects an unselected pixel as a selected pixel from pixels constituting the inspection target image. The inspection processing unit 305 determines whether the selected pixel is included in an inspection region defined by the content information of the comparison reference image.

If the inspection processing unit 305 determines that the selected pixel is included in the inspection region, it determines that the selected pixel is an inspection target pixel, and the process advances to step S1106. If the inspection processing unit 305 determines that the selected pixel is not included in the inspection region, it determines that the selected pixel is not an inspection target pixel (is excluded), and the process advances to step S1105.

In step S1106, the inspection processing unit 305 calculates a difference (absolute value of a difference) between the pixel value of the selected pixel and the pixel value of a pixel corresponding to the selected pixel in the comparison reference image, and determines whether the difference is equal to or larger than a threshold. If the difference is equal to or larger than the threshold, the inspection processing unit 305 determines that the selected pixel is an NG pixel. If the difference is smaller than the threshold, the inspection processing unit 305 determines that the selected pixel is not an NG pixel.

In step S1108, the inspection processing unit 305 determines whether an image region formed from a set of NG pixels satisfies an inspection standard corresponding to a set inspection level. If the inspection processing unit 305 determines that the image region formed from a set of NG pixels satisfies the inspection standard corresponding to the set inspection level, it determines that there is no defect, and the process advances to step S1109. If the inspection processing unit 305 determines that the image region formed from a set of NG pixels does not satisfy the inspection standard corresponding to the set inspection level, it determines that there is a defect, and the process advances to step S1110. For example, when a set inspection level for a circular defect is "7", a $\phi$0.15-mm or larger circular image region formed from NG pixels is determined as a "defect". For example, when a set inspection level for a circular defect is "3", a ϕ0.2-mm or larger circular image region formed from NG pixels is determined as a "defect".

In step S1109, the inspection processing unit 305 does not notify the inspection unit 106 via the communication unit 306 of NG determination, and the large-capacity stacker 107 causes the discharge unit 223 to perform processing for "stacking the sheet of a page corresponding to an inspection target image on the top tray".

In step S1111, the UI unit 302 displays on the display unit 245 a screen representing a message that the inspection is completed. The user can operate the screen to input an instruction to newly perform inspection or an instruction to end inspection.

In the embodiment, an inspection for a positional shift is performed first and then an inspection for a stain is performed. However, these inspections may be performed in parallel or an inspection for a stain may be performed first, and the form is not limited to a specific one. One or a plurality of inspection target images can be inspected successively.

As described above, according to the first embodiment, some pages (for example, a contents page and title page) different in layout and properties can be automatically excluded from a printed product formed from many pages in a predetermined format such as a book or a manual, and inspection setting can be performed at once. An output product from the printing apparatus can be inspected using the set inspection setting.

Second Embodiment

A difference from the first embodiment will be described below and the remaining part is similar to the first embodiment, unless otherwise specified. In the second embodiment, whether to apply inspection setting to other pages at once is determined in accordance with the details of the inspection setting.

Figure 12A:
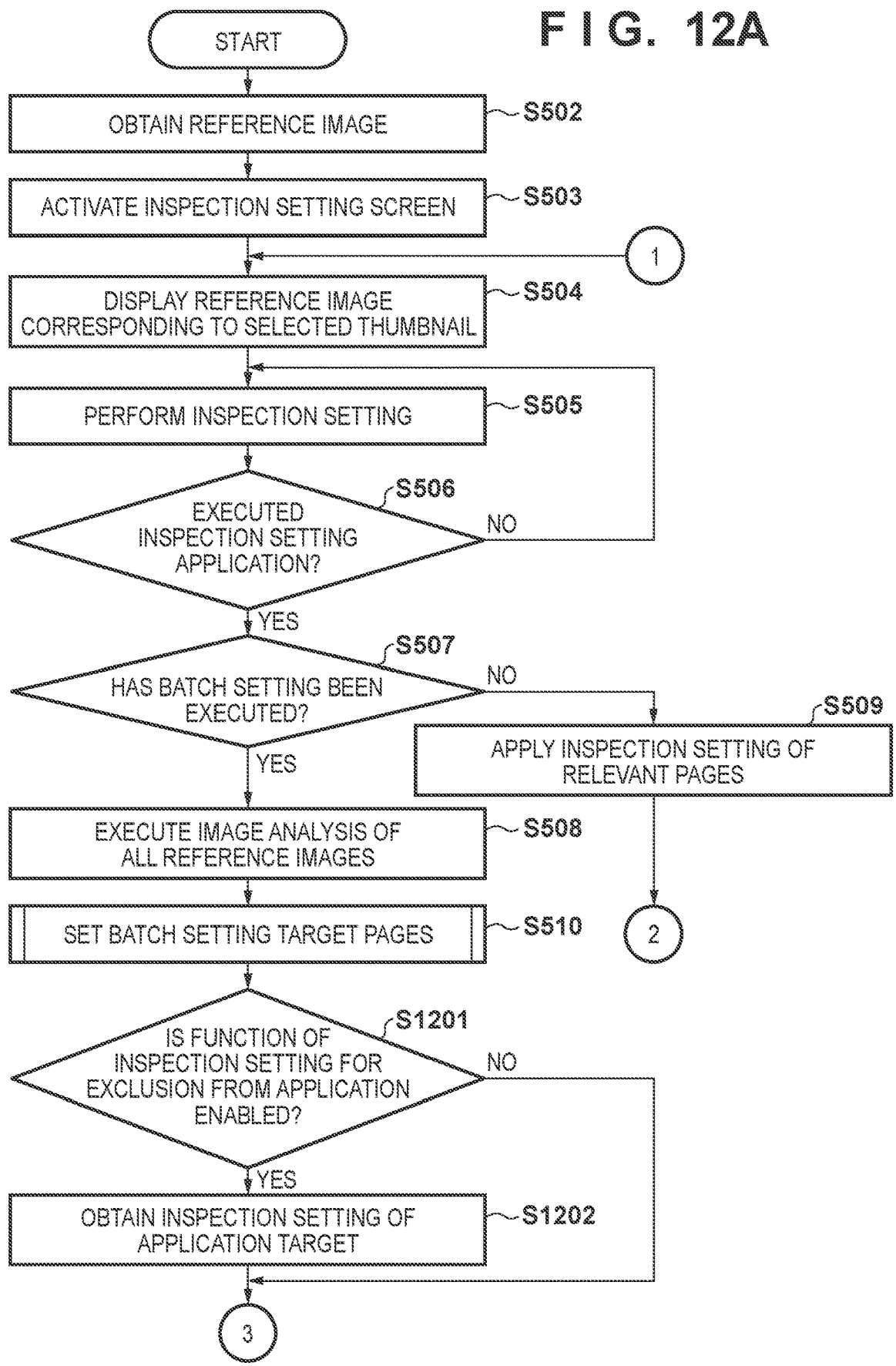
FIG. 12A is a flowchart of reference image creation processing and inspection setting processing using the inspection setting screen in FIG. 4.
Figure 12B:
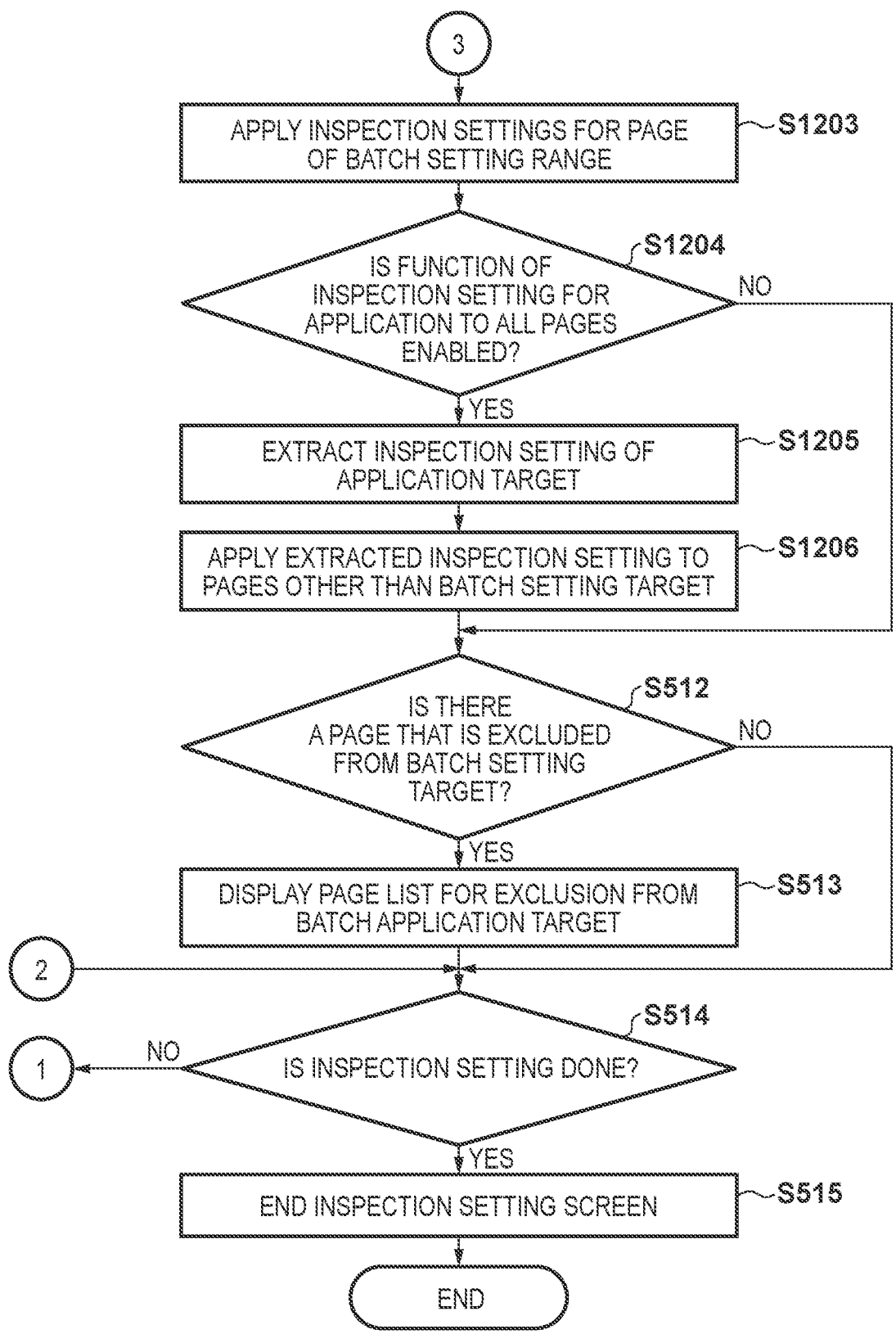
FIG. 12B is a flowchart of reference image creation processing and inspection setting processing using the inspection setting screen in FIG. 4.

Reference image creation processing and inspection setting processing using an inspection setting screen in FIG. 4 according to the second embodiment will be described with reference to FIGS. 12A and 12B each showing a flowchart of them. In FIGS. 12A and 12B, the same step numbers denote the same processing steps as those shown in FIG. 5, and a description of these processing steps will not be repeated.

Figure 13:
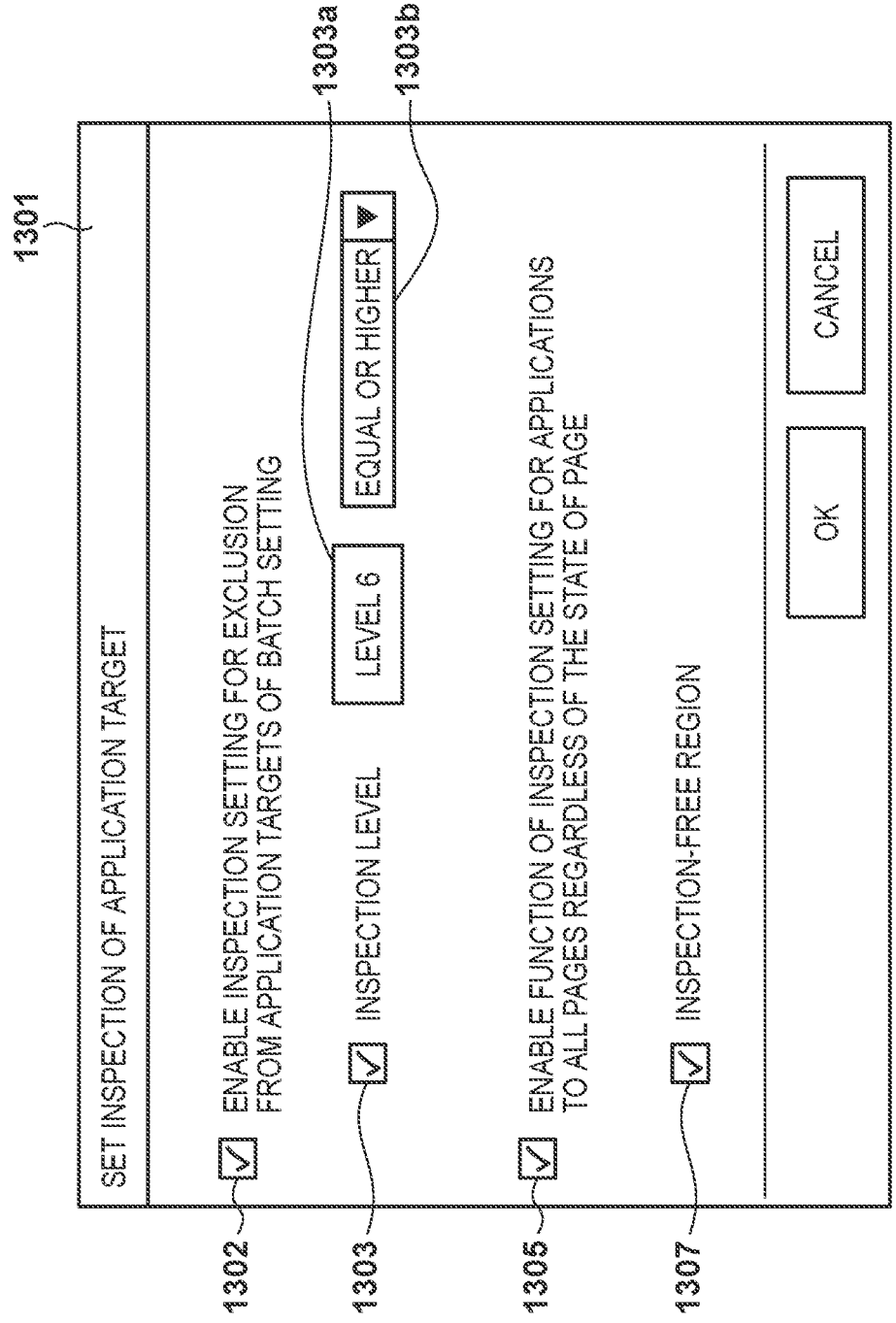
FIG. 13 is a view showing a display example of an application target setting screen 1301.

In step S1201, a control unit 303 determines whether the function of inspection setting for exclusion from application is enabled. FIG. 13 is a view showing a display example of an application target setting screen 1301 for inspection setting displayed when the user designates a button (not shown) on a toolbar 402 of an inspection setting screen 401.

A check box 1302 can be checked to enable "inspection setting for exclusion from application targets of batch setting". When the check box 1302 is checked, a check box 1303 becomes operable.

When the check box 1303 is checked, an inspection level can be designated. A numerical value representing an inspection level can be input in an area 1303a, and either "equal or higher" or "lower" can be selected from a pulldown menu 1303b. In the example of FIG. 13, "level 6" is input in the area 1303a and "equal or higher" is selected from the pulldown menu 1303b, so "inspection level 6 or higher" is selected as the inspection level. Inspection setting at inspection level 6 or higher means a setting of excluding a page from application targets at the time of batch setting.

In step S1201, the control unit 303 determines whether the check boxes 1302 and 1303 are checked. If the control unit 303 determines that the check boxes 1302 and 1303 are checked, the process advances to step S1202. If the control unit 303 determines that the check boxes 1302 and 1303 are not checked, the process advances to step S1203.

In step S1202, if the check box 1303 is checked, the control unit 303 obtains the inspection setting of an inspection region not matching the conditions designated in the area 1303a and the pulldown menu 1303b out of the inspection settings of respective inspection regions in step S505. In the example of FIG. 13, if the check box 1303 is checked, the control unit 303 excludes inspection parameters at inspection level 6 or higher and corresponding inspection regions from application targets at the time of batch setting.

If the process advances from step S1201 to step S1203 via step S1202, the control unit 303 applies in step S1203 setting information representing the details of the inspection setting obtained in step S1202 to a page currently displayed at a page preview portion 404 and target pages set in step S510. That is, the control unit 303 stores the setting information in a RAM 227 as setting information of the page currently displayed at the page preview portion 404 and that of the target pages set in step S510.

If the process advances from step S1201 to step S1203, the control unit 303 applies in step S1203 setting information representing the details of the inspection setting performed in step S505 to the page currently displayed at the page preview portion 404 and the target pages set in step S510. That is, the control unit 303 stores the setting information in the RAM 227 as setting information of the page currently displayed at the page preview portion 404 and that of the target pages set in step S510.

In step S1204, the control unit 303 determines whether the function of inspection setting for application to all pages is enabled. In FIG. 13, a check box 1305 can be checked to enable the function of "inspection setting for application to all pages regardless of the state of a page". When the check box 1305 is checked, a check box 1307 becomes operable.

When the check box 1307 is checked, a setting is enabled in which the inspection setting of an inspection region (inspection-free region) set by the user as no inspection target in a reference image is applied to the reference images of all pages.

In step S1204, the control unit 303 determines whether the check boxes 1305 and 1307 are checked. If the control unit 303 determines that the check boxes 1305 and 1307 are checked, the process advances to step S1205. If the control unit 303 determines that the check boxes 1305 and 1307 are not checked, the process advances to step S512.

In step S1205, if the check box 1307 is checked, the control unit 303 obtains the inspection setting of an inspection region (inspection-free region) set by the user as no inspection target in the reference image.

In step S1206, the control unit 303 applies setting information representing the inspection setting obtained in step S1205 to pages other than the page currently displayed at the page preview portion 404 and the target pages set in step S510. That is, the control unit 303 stores the setting information in the RAM 227 as setting information of pages other than the page currently displayed at the page preview portion 404 and the target pages set in step S510.

FIG. 14 shows a display example of the page preview portion 404 at which an "inspection region (inspection-free region) excluded from inspection targets in a reference image" is displayed on the inspection setting screen 401. Regions 1401, 1402, and 1403 are inspection regions set on a reference image in accordance with a user operation.

The region 1401 is an inspection region set on the reference image by the user as not an inspection-free region but an inspection region. The region 1402 is an inspection region that meets conditions designated in the area 1303a and the pulldown menu 1303b, and is an inspection region corresponding to the inspection setting for exclusion from application targets of batch setting. The region 1403 is a setting region set when a check box 405a is checked, and is an inspection-free region. In FIG. 14, the frames of the respective regions 1401, 1402, and 1403 are displayed by different dotted patterns so that they can be visually recognized. Note that the display form of the frames of the respective inspection regions is not limited to a specific one as long as the respective inspection regions can be discriminated by changing, for example, the thickness, color, or shape of the frame line. A different display form of the inspection setting frame represents that a specific condition is set.

The above-described settings "inspection setting for exclusion from application targets of batch setting" and "inspection setting for application to all pages regardless of the state of a page" are set not only on the application target setting screen 1301 of FIG. 13, but can be set for each inspection region at a setting portion 405 on the inspection setting screen 401 of FIG. 4.

As described above, according to the second embodiment, as for specific inspection setting, a page can be excluded from application targets of batch setting. For example, when inspection setting is performed to inspect a specific part (for example, a face part of an image) of an image very severely, it can be prevented to apply this inspection setting to other pages at once. On the other hand, specific inspection setting can be applied at once to even a page for which batch setting is undesirable. For example, preprinted portions of a printed product obtained by printing on preprinted sheets can be set as inspection-free regions at once regardless of the state of contents on an entire page.

The details of inspection on a printed product are not limited to the above example. The type of inspection is arbitrary as long as the inspection is executed by evaluating a difference from an inspection region in a reference image based on inspection parameters for the inspection region.

The arrangement shown in FIG. 1 is merely an example of the system arrangement applicable to each of the above-described embodiments, and another system arrangement may also be adopted as long as similar effects can be obtained. For example, two or more apparatuses may be combined into one apparatus, or two or more apparatuses may share the functions of one apparatus. For example, the inspection apparatus 108 and the printing apparatus 101 may be combined into one apparatus to constitute a printing apparatus that captures the image of a sheet printed by it and inspects a captured image obtained by the capturing.

Numerical values, processing timings, processing orders, and the like used in the above description are merely examples for concrete descriptions, and the present invention is not limited to the numerical values, processing timings, processing orders, and the like.

Some or all of the above-described embodiments and modifications may be properly combined and used. Some or all of the above-described embodiments and modifications may selectively use.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-025401, filed Feb. 18, 2020, which is hereby incorporated by reference herein in its entirety.

What is claimed is:

1. An inspection apparatus comprising:
   at least one of (a) one or more processors and a storage medium and (b) circuitry, the at least one of (a) one or more processors and a storage medium and (b) circuitry being configured to act as a plurality of units comprising:
   (1) a first obtaining unit configured to obtain a plurality of reference images;
   (2) a second obtaining unit configured to obtain an inspection target image;
   (3) a setting unit configured to set, for at least one reference image among the plurality of reference images, an inspection region to be inspected; and
   (4) an inspection unit configured to inspect the inspection target image based on a result of comparison of the inspection target image and the reference image in which the inspection region is set,
   wherein the setting unit comprises: (a) a first setting unit configured to set the inspection region for a first reference image selected from the plurality of reference images; and (b) a second setting unit configured to set, for a second reference image which is selected from the plurality of reference images and which is different from the first reference image, the inspection region in a case where the second reference image is an image satisfying a predetermined condition.

2. The inspection apparatus according to claim 1, further comprising a display unit,
   wherein the first setting unit sets, in accordance with a user operation to the first reference image displayed on the display unit, at least (a) the inspection region and (b) an inspection standard for the inspection region.

3. The inspection apparatus according to claim 1, wherein the plurality of units further comprises an image analysis unit configured to perform image analysis on the reference image, and
wherein the second setting unit (a) determines, based on a result of image analysis on the second reference image by the image analysis unit, whether the second reference image is the image satisfying the predetermined condition, and (b) sets the inspection region for the second reference image based on a result of the determination.

4. The inspection apparatus according to claim 1, wherein the plurality of units further comprises a condition setting unit configured to set the predetermined condition in accordance with a user operation.

5. The inspection apparatus according to claim 1, wherein the predetermined condition includes a condition where at least the second reference image is not an image corresponding to a white page.

6. The inspection apparatus according to claim 1, wherein the second reference image includes at least a content having the same type as that of a content included in the first reference image.

7. The inspection apparatus according to claim 1, wherein the second reference image is an image in which a degree of coincidence with a layout of a content included in the first reference image is not lower than a threshold.

8. The inspection apparatus according to claim 1, wherein the predetermined condition includes a condition where at least the second reference image is an image including a font of a font size not larger than a threshold.

9. The inspection apparatus according to claim 8, wherein the plurality of units further comprises a threshold setting unit configured to set the threshold in accordance with an inspection level representing severity of inspection.

10. The inspection apparatus according to claim 1, wherein, in a case where the second reference image is the image satisfying the predetermined condition, the second setting unit sets, for the second reference image, only an inspection region satisfying an inspection region condition among inspection regions in the first reference image.

11. The inspection apparatus according to claim 10, wherein the plurality of units further comprises a condition setting unit configured to set the inspection region condition in accordance with a user operation.

12. The inspection apparatus according to claim 10, wherein the inspection region satisfying the inspection region condition is an inspection region where an inspection level representing severity of inspection is lower than a threshold.

13. The inspection apparatus according to claim 1, wherein the inspection region includes a region not to be inspected.

14. The inspection apparatus according to claim 1, wherein the inspection apparatus is communicatively connected to a printing apparatus, and
wherein the second obtaining unit receives, as the inspection target image, a scan image that the printing apparatus generates by scanning a printed product, and
wherein the inspection unit inspects, based on a result of comparison of the reference image and the scan image corresponding to the reference image, the inspection region of the printed product.

15. The inspection apparatus according to claim 14, wherein the first obtaining unit obtains the plurality of reference images that the printing apparatus generates by scanning the printed product.

16. The inspection apparatus according to claim 14, wherein, in a case where a difference between (a) a pixel value of a selection pixel of the reference image and (b) a pixel value of a pixel, corresponding to the selection pixel, of the scan image corresponding to the reference image is not less than a threshold, the inspection unit sets the selection pixel as a NG pixel and determines the printed product as a defect in a case where an image region formed from NG pixels does not satisfy an inspection standard.

17. The inspection apparatus according to claim 1, wherein the first obtaining unit includes:
a printing unit configured to print on a page; and
a unit configured to capture an image of the page printed by the printing unit to obtain the image of the page as the reference image.

18. The inspection apparatus according to claim 1, wherein, in a case where the second reference image is not an image satisfying the predetermined condition, the second setting unit provides notification that an inspection region is not set for the second reference image.

19. An inspection method comprising:
(1) obtaining a plurality of reference images;
(2) obtaining an inspection target image;
(3) setting, for at least one reference image among the plurality of reference images, an inspection region to be inspected; and
(4) inspecting the inspection target image based on a result of comparison of the inspection target image and the reference image in which the inspection region is set,
wherein the setting comprises: (a) setting the inspection region for a first reference image selected from the plurality of reference images; and (b) setting, for a second reference image which is selected from the plurality of reference images and which is different from the first reference image, the inspection region in a case where the second reference image is an image satisfying a predetermined condition.

20. A non-transitory computer-readable storage medium storing a computer program for causing a computer to function as a plurality of units comprising:
(1) a first obtaining unit configured to obtain a plurality of reference images;
(2) a second obtaining unit configured to obtain an inspection target image;
(3) a setting unit configured to set, for at least one reference image among the plurality of reference images, an inspection region to be inspected; and
(4) an inspection unit configured to inspect the inspection target image based on a result of comparison of the inspection target image and the reference image in which the inspection region is set,
wherein the setting unit comprises: (a) a first setting unit configured to set the inspection region for a first reference image selected from the plurality of reference images; and (b) a second setting unit configured to set, for a second reference image which is selected from the plurality of reference images and which is different from the first reference image, the inspection region in a case where the second reference image is an image satisfying a predetermined condition.

* * * * *